Feb. 15, 1955

W. E. MATHES 2,702,066

PIPE BENDER

Filed Aug. 31, 1953

William E. Mathes
INVENTOR.

BY

Feb. 15, 1955   W. E. MATHES   2,702,066
PIPE BENDER

Filed Aug. 31, 1953   2 Sheets-Sheet 2

William E. Mathes
INVENTOR.

BY
Attorneys

United States Patent Office 2,702,066
Patented Feb. 15, 1955

2,702,066

PIPE BENDER

William E. Mathes, Erin, Tenn.

Application August 31, 1953, Serial No. 377,365

2 Claims. (Cl. 153—45)

This invention relates to a pipe bender and more particularly to a pipe bending machine for bending copper and steel tubing, and other thin walled pipes.

An object of this invention is to provide a pipe bender which will bend a pipe into a complete circle and will not flatten or kink the pipe.

Another object of this invention is to provide a pipe bender having an idler pulley adapted to be moved around a central hub for bending the pipe about the central hub.

A further object of this invention is to provide a pipe bender which can be adjusted to accommodate pipes having various diameters.

A still further object of this invention is to provide a pipe bender wherein the pipe to be bent can easily be secured to the machine or removed from the machine.

A yet further object of this invention is to provide a pipe bender of simple, practical, rugged construction which is easy to operate and thoroughly reliable and efficient in use.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1:
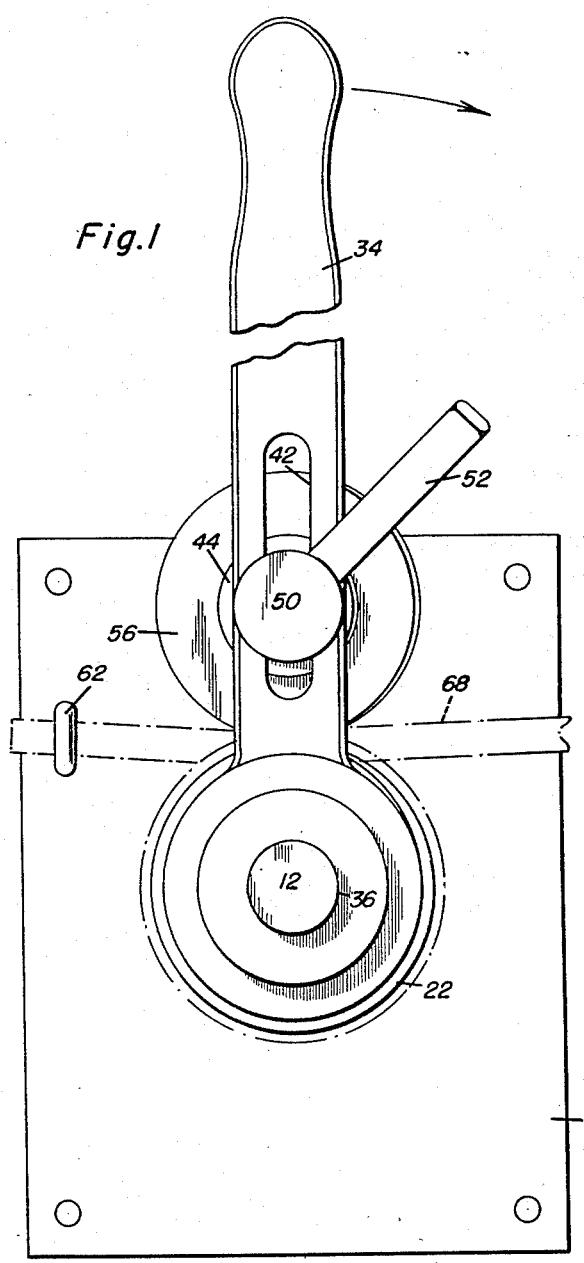
Figure 1 is a top view of the preferred form of the present invention, showing the pipe to be bent in dotted lines.
Figure 2:
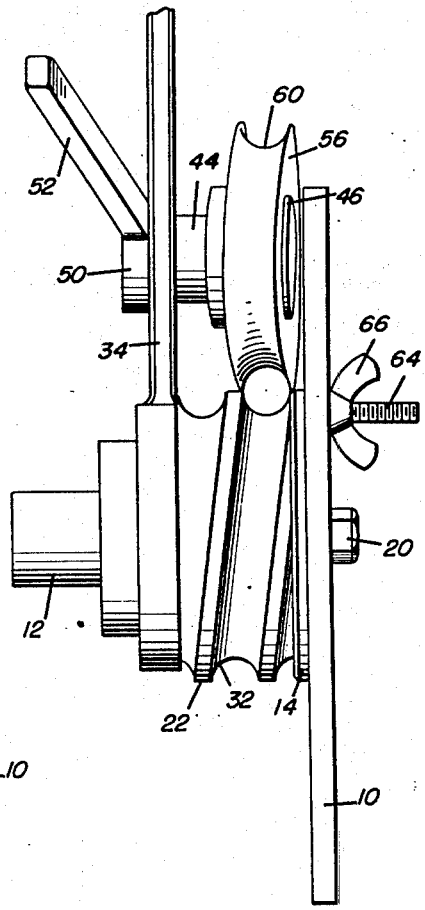
Figure 2 is a side elevational view of the preferred form of the present invention.
Figure 3:
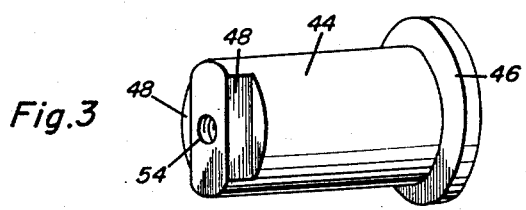
Figure 3 is a perspective view of the shaft for mounting the idler pulley on the lever.
Figure 5:
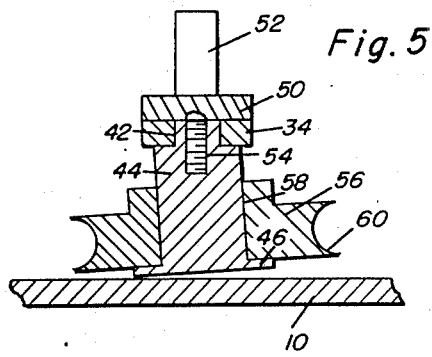
Figure 5 is a vertical, sectional view showing the inclination of the shaft for mounting the idler pulley with respect to the lever.
Figure 4:
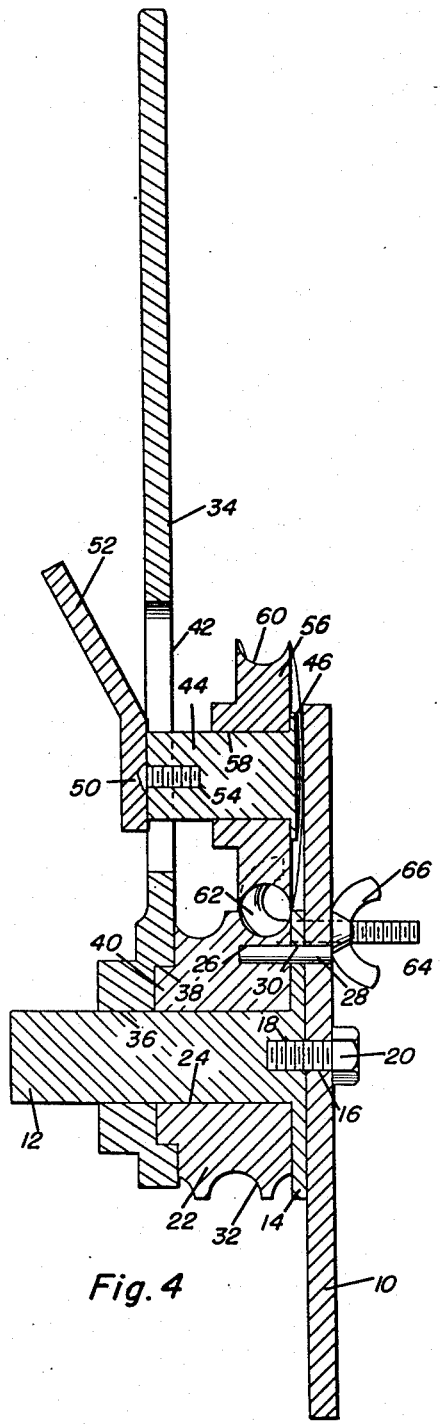
Figure 4 is a vertical, sectional view of the preferred form of the present invention showing the mounting of the hub and the idler pulley.
Figure 6:
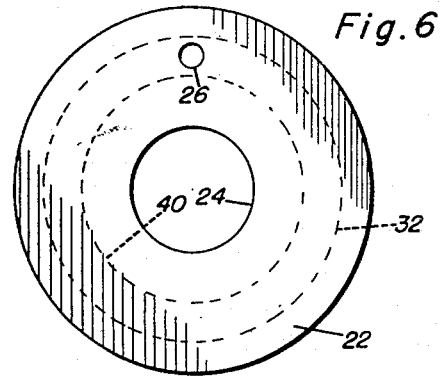
Figure 6 is a bottom view of the hub portion which is mounted on the pin on the base plate.
Figure 7:
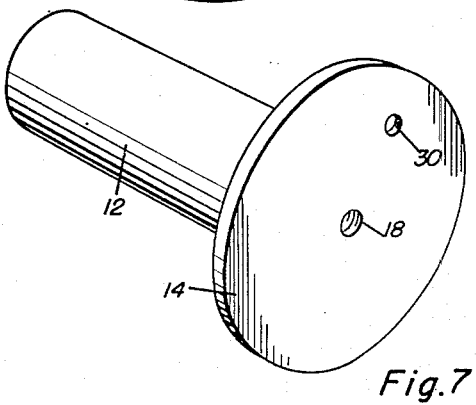
Figure 7 is a perspective view of the mounting pin which is secured to the base plate.

Referring now more particularly to the accompanying drawings, it will be seen that the improved pipe bender forming the subject of this invention includes, as shown in Figure 1, a base plate 10 having a central pin 12 mounted thereon. The pin 12 has a radially outwardly extending flange 14 secured to the bottom thereof. The plate 10 is provided with a central aperture 16 and the bottom surface of the pin 12 is provided with an internally threaded recess 18 adapted to be aligned with the aperture 16 in the plate 10. A threaded bolt 20 extends through the aperture 16 and into the recess 18 for securing the pin 12 to the plate 10.

A cylindrical hub 22 having a central aperture 24 therein is slidably received on the pin 12. The bottom surface of the hub 22 is provided with a recess 26. A pin 28 is secured to the base plate 10 and extends through an aperture 30 in the flange 14 of pin 12 and into the recess 26 in the hub 22. The pin 28 thus prevents rotation of the pin 12 on the base plate 10 and also rotation of the hub 22 on the pin 12.

The outer circumferential surface of the hub 22 is provided with a suitable groove 32.

A lever 34 is provided with an aperture 36 at one end thereof, which aperture is adapted to receive the pin 12 whereby the lever 34 is mounted for rotation about the pin 12. The handle 34 is provided with a counterbore 38 on one side adjacent the aperture 36, which counterbore receives an annular projection 40 on the upper end of hub 22. Thus the connection of the handle 34 to the pin 12 is provided with greater stability.

The handle 34 is provided with a longitudinal slot 42 adjacent the end which is connected to the pin 12. A shaft 44 is adjustably secured to the handle 34. The shaft 44 has a radially outwardly extending flange 46 at one end thereof and a pair of opposed notches 48 at the other end thereof. The notches 48 are adapted to receive the sides of lever 34 adjacent the slot 42 to thereby prevent rotation of the shaft 44 with respect to the lever 34. A threaded bolt 50 having a lever arm 52 secured thereto is received in a threaded recess 54 in the head of the shaft 44 adjacent the notches 48. The under surface of the head of the bolt 50 engages one side of the lever arm 34 and the notches 48 engage lever arm 34 from the other side thereby when the bolt 50 is tightened by means of lever arm 52 the shaft 44 will be frictionally retained in adjusted position within the slot 42.

The shaft 44 has its longitudinal axis inclined with respect to the vertical plane through the longitudinal axis of the lever. An idler pulley 56 having a central aperture 58 is rotatably mounted on the shaft 44. The idler pulley 56 is provided with a groove 60 extending around its outer circumference. Due to the inclination of the shaft 44 the idler pulley 56 will revolve in a helical path parallel to the helical groove 32 on the hub 22.

The base plate 10 is provided with a member having a hook portion 62 and a threaded portion 64 mounted thereon. The hook portion 62 extends above the upper surface of the plate 10 and the threaded portion 64 extends through the plate 10 and below the plate and a wing nut is mounted on the threaded portion 64 for retaining the hook portion 62 in adjusted position. The hook portion 62 engages the end of a pipe 68 to be bent by means of the improved pipe bending machine.

In practical use, when it is desired to bend a pipe or tubing the lever 34 is first removed from the pin 12. The end of the pipe to be bent is then clamped to the base plate by means of the hook portion 62. Then the lever is mounted on the pin 12 and the idler pulley 56 is adjusted so as to clamp the pipe tube in the grooves 32 and 60. The idler pulley 56 is locked in adjusted position by means of the bolt 50 and lever 52. Then the lever 34 is swung around the pin 12 causing the idler pulley 56 to press the pipe or tube against the hub 22. When the desired amount of bending is attained in the tube, the idler pulley 56 is released from its adjusted position and the lever arm 34 is removed from the pin 12. Then the hook portion 62 is released from its clamping position and the tube can be removed from the hub 22. In some instances, it may be necessary to remove the hub 22 from the pin 12 and unscrew the pipe or tube from the hub 22. This can easily be accomplished with the improved pipe bender forming the subject of this invention which provides an easy method of removing or replacing the hub 22.

When tubes of various diameters are to be bent, a suitable hub having a groove of such a dimension as to correspond to the dimensions in the tube to be bent can be placed on the pin 12. Further, idler pulleys having various sized grooves therein can also be placed on the shaft 44.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly all suitable modifications and equivalents may be resorted to, falling within the scope of the appended claims.

What is claimed as new is as follows:

1. A pipe bender comprising a base plate, a center pin fixedly secured to said base plate and extending upwardly therefrom, a cylindrical hub mounted on said pin, said hub having a helical groove in the outer circumferential surface thereof, a lever arm removably mounted at one end thereof on the upper end of said pin, said lever arm being rotatable about said pin, and an idler pulley secured on said lever arm spaced from said end, the outer circumference of said pulley lying closely adjacent the circumference of said hub, said pin having a radially outwardly extending flange secured to the bottom thereof, an aperture in said flange, a projection extending upwardly from said base plate, through said aperture, said projection spaced from and extending parallel to said pin, said hub having a recess in the bottom surface thereof receiving said projection thereby preventing rotation of said hub about said pin.

2. A pipe bender comprising a base plate, a center pin fixedly secured to said base plate and extending upwardly therefrom, a cylindrical hub mounted on said pin, said hub having a helical groove in the outer circumferential surface thereof, a lever arm removably mounted at one end thereof on the upper end of said pin, said lever arm being rotatable about said pin, and an idler pulley secured on said lever arm spaced from said end, the outer circumference of said pulley lying closely adjacent the circumference of said hub, said pin having a radially outwardly extending flange secured to the bottom thereof, an aperture in said flange, a projection extending upwardly from said base plate, through said aperture, said projection spaced from and extending parallel to said pin, said hub having a recess in the bottom surface thereof receiving said projection thereby preventing rotation of said hub about said pin, said idler pulley being freely rotatable about a shaft secured to said lever, said shaft having a longitudinal axis inclined with respect to the vertical plane of the longitudinal axis of the lever.

References Cited in the file of this patent

UNITED STATES PATENTS

| | | |
|---|---|---|
| 280,983 | Whitlock | July 10, 1893 |
| 1,436,225 | DeAguiar | Nov. 21, 1922 |
| 2,141,010 | Minister | Dec. 20, 1938 |
| 2,382,901 | Newsome | Aug. 14, 1945 |
| 2,491,857 | Greiner | Dec. 20, 1949 |
| 2,569,544 | Tal | Oct. 2, 1951 |

FOREIGN PATENTS

| | | |
|---|---|---|
| 209,516 | Great Britain | Jan. 17, 1924 |